United States Patent
Chen et al.

(10) Patent No.: US 8,428,415 B2
(45) Date of Patent: Apr. 23, 2013

(54) BEND INSENSITIVE OPTICAL FIBERS WITH LOW REFRACTIVE INDEX GLASS RINGS

(75) Inventors: Xin Chen, Corning, NY (US); Ming-Jun Li, Horseheads, NY (US); Anping Liu, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 1141 days.

(21) Appl. No.: 12/351,221

(22) Filed: Jan. 9, 2009

(65) Prior Publication Data

US 2010/0178504 A1   Jul. 15, 2010

(51) Int. Cl.
*G02B 6/036* (2006.01)
(52) U.S. Cl.
USPC .......................................................... 385/128
(58) Field of Classification Search .................. None
See application file for complete search history.

(56) References Cited

U.S. PATENT DOCUMENTS

| | | | |
|---|---|---|---|
| 4,707,076 A | 11/1987 | Skutnik et al. | |
| 4,852,968 A * | 8/1989 | Reed | 385/127 |
| 6,775,451 B1 | 8/2004 | Botelho et al. | 385/128 |
| 6,804,441 B2 * | 10/2004 | Arai et al. | 385/123 |
| 6,849,333 B2 | 2/2005 | Schissel et al. | 428/392 |
| 7,437,046 B2 * | 10/2008 | DiGiovanni et al. | 385/128 |
| 7,539,381 B2 | 5/2009 | Chen et al. | 385/124 |
| 7,555,186 B2 * | 6/2009 | Flammer et al. | 385/127 |
| 7,590,324 B1 | 9/2009 | Chen et al. | 385/128 |
| 7,603,015 B2 * | 10/2009 | Bickham et al. | 385/127 |
| 7,680,381 B1 * | 3/2010 | Bookbinder et al. | 385/127 |
| 8,073,301 B2 * | 12/2011 | Gibson et al. | 385/127 |
| 2005/0271347 A1 | 12/2005 | Kimball et al. | |
| 2007/0127878 A1 * | 6/2007 | Demontmorillon et al. | 385/124 |
| 2009/0274428 A1 | 11/2009 | Chen et al. | 385/127 |

FOREIGN PATENT DOCUMENTS

| | | |
|---|---|---|
| EP | 1329750 A2 | 7/2003 |
| EP | 1930753 A1 | 6/2008 |
| EP | 2175295 A1 | 4/2010 |
| GB | 2449164 A | 11/2008 |
| WO | 2008027336 A1 | 3/2008 |

OTHER PUBLICATIONS

Tsuchida, Yukihiro, et al., "Design and characterization of single-mode holey fibers with low bending losses", Optics Express, Jun. 13, 2005, vol. 13, No. 12, pp. 4770-4779.
Yamauchi, J., et al., "Analysis of bent step-index optical fibres by the beam propagation method", IEE Proceedings—J, vol. 139, No. 3, Jun. 1992, pp. 201-207.
Li, Ming-Jun, et al., "Analysis of Multipath Interference in Bend-insensitive Single-Mode Fibers", NTR-105123, Apr. 18, 2008, Submitted to ECOC 2008.
Li, Ming-Jun, et al., "Statistical Analysis of MPI in Bend-insensitive Fibers".

* cited by examiner

*Primary Examiner* — Michelle R Connelly
(74) *Attorney, Agent, or Firm* — Robert L. Carlson

(57) ABSTRACT

An optical fiber includes a silica-based glass portion having an outer diameter of less than about 120 μm. The glass portion comprises a core, an inner cladding and a low index ring. The core comprises an index of refraction $n_1$, and a relative refractive index percent $\Delta_1\%$ relative to pure silica glass. The inner cladding surrounds the core and comprises an index of refraction $n_2$, a radial thickness of less than about 40 μm and a relative refractive index percent $\Delta_2\%$ relative to pure silica glass, wherein $\Delta_1\% > \Delta_2\%$ and the difference between $\Delta_1\%$ and $\Delta_2\%$ is greater than 0.1%. The low index ring surrounds the inner cladding and comprises boron and fluorine, a radial thickness of less than about 20 μm, an index of refraction $n_3$ and a third relative refractive index percent $\Delta_3\%$ relative to pure silica glass, wherein $\Delta_2\% > \Delta_3\%$ and $\Delta_3\%$ is less than −0.5%.

19 Claims, 2 Drawing Sheets

BEND INSENSITIVE OPTICAL FIBERS WITH LOW REFRACTIVE INDEX GLASS RINGS

BACKGROUND OF THE INVENTION

1. Field of the Invention

The present invention relates generally to optical fibers, and particularly to bend insensitive optical fibers comprising a low index of refraction glass ring therein.

2. Technical Background

Glass optical fibers with improved bend loss properties have recently been of significant interest in the telecommunications field. Techniques for improving fiber bending properties can play important roles in many types of fibers, including optical fibers used in compact applications, such as for example erbium doped amplifiers and dispersion compensating modules where bending loss has limited many designs from practical use. In certain applications such as fiber to the home applications, the ability to form a tight bending diameter, for example of 50 or 20 mm or less is desired with negligible bending loss. Many of the proposed solutions for this problem involve significant modification of the fiber refractive index profile.

SUMMARY OF THE INVENTION

According to one embodiment shown and described herein, an optical fiber includes a silica-based glass portion having an outer diameter of less than about 110 μm. The glass portion comprises a core, an inner cladding and a low index ring. The core comprises an index of refraction $n_1$, and a relative refractive index percent $\Delta_1\%$ relative to pure silica glass. The inner cladding surrounds the core and comprises an index of refraction $n_2$, a radial thickness of less than about 40 μm and a relative refractive index percent $\Delta_2\%$ relative to pure silica glass, wherein $\Delta_1\% > \Delta_2\%$ and the difference between $\Delta_1\%$ and $\Delta_2\%$ is greater than about 0.1%. The low index ring surrounds the inner cladding and comprises silica glass co-doped with boron and fluorine, a radial thickness of less than about 20 μm, an index of refraction $n_3$ and a third relative refractive index percent change $\Delta_3\%$ relative to pure silica glass, wherein $\Delta_2\% > \Delta_3\%$ and $\Delta_3\%$ is less than about −0.5%.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

The "refractive index profile," as used herein, is the relationship between refractive index or relative refractive index and waveguide fiber radius.

"Relative refractive index percent," as used herein, is defined as:

$$\Delta_i\% = 100 \times \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass.

More specifically, as used herein, $\Delta_1\%$ refers to the relative refractive index percent of a core of the optical fiber, $\Delta_2\%$ refers to the relative refractive index percent of an inner cladding of the optical fiber and $\Delta_3\%$ refers to the relative refractive index percent of a low index ring of the optical fiber.

The bend resistance or bend performance of an optical fiber may be measured by the induced attenuation of light propagating through the fiber under prescribed test conditions. As used herein, the 10, 15, and 20 mm diameter macrobend tests for measuring the bend performance of an optical fiber consist of wrapping the fiber 5 times around a 10, 15, and 20 mm diameter mandrel, respectively, and calculating the induced attenuation (i.e. the increase in attenuation) per turn or per meter caused by wrapping the fiber around the mandrel.

Unless otherwise specified herein, measurements of the properties of the optical fiber are taken at 1550 nm.

Figure 1:
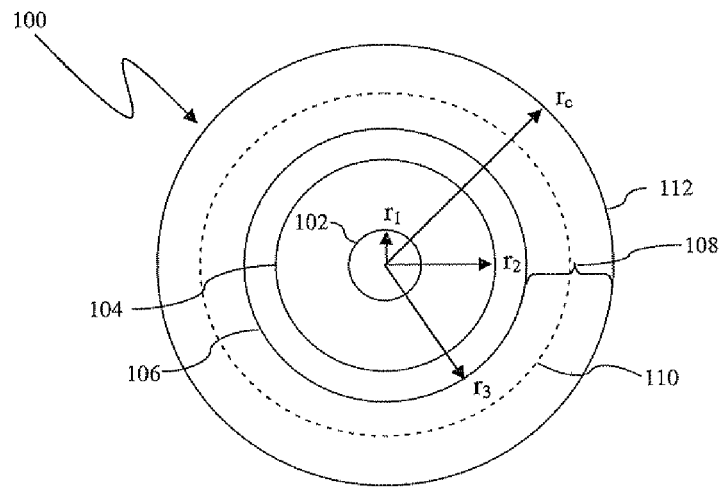
FIG. 1 is a cross sectional view of an optical fiber 100 comprising a core 102, an inner cladding 104, a low index ring 106 and a protective coating 108 according to one or more embodiments shown and described herein.

FIG. 1 shows a cross section of an optical fiber according to one or more embodiments shown and described herein. The optical fibers described herein generally comprise a glass portion comprising a core and a low index ring spaced apart from the core. The glass portion of the optical fiber may be surrounded by one or more optical coating layers. The structure and composition of the optical fibers as well as the properties of the optical fibers will be described and discussed in more detail herein.

Figure 2:
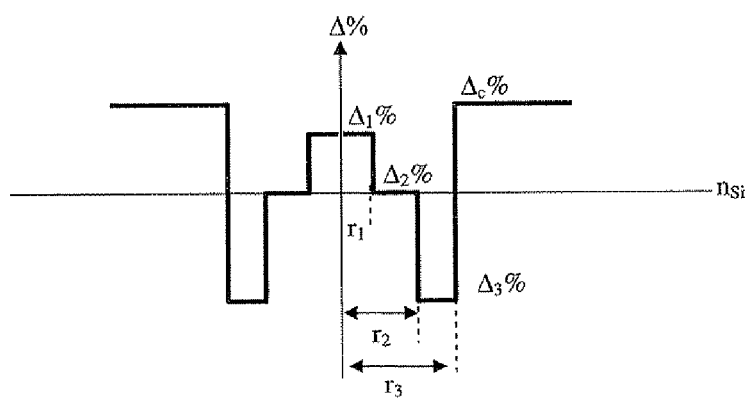
FIG. 2 graphically depicts the refractive index profile of the optical fiber 100 of FIG. 1.

Referring to FIGS. 1 and 2, a cross section of an optical fiber and the corresponding refractive index profile for the optical fiber are shown according to one or more embodiments described herein. The optical fiber generally comprises a glass portion comprising a core 102, and a low index ring 106 spaced apart from the core. An inner cladding 104 may be disposed between the core 102 and the low index ring 106. The glass portion of the optical fiber may be surrounded by one or more optical coating layers 108. In the embodiment shown in FIG. 1, the core 102, the inner cladding 104 and the low index ring 106 generally comprise silica, specifically silica-based glass. The cross section of the optical fiber 100 may be generally circular-symmetric with respect to the center of the core 102 and the core 102 may have a radius $r_1$. The inner cladding 104 may surround the core 102 and extend from the radius $r_1$ to the radius $r_2$ such that the inner cladding has a radial thickness $T_2=r_2-r_1$. The low index ring 106 may surround the inner cladding 104 and extend from the radius $r_2$ to the radius $r_3$ such that the low index ring has a radial thickness $T_3=r_3-r_2$. Accordingly, the glass portion of the optical fiber (e.g., the core 102, inner cladding 104 and low index ring 106) may have an outer diameter $2r_3$.

In the embodiments described herein, the outer diameter ($2r_3$) of the glass portion of the optical fiber 100 is less than about 120 µm, preferably less than about 110 µm, more preferably less than about 90 µm, and, most preferably, less than about 85 µm. The outer diameter ($2r_3$) of the glass portion of the optical fiber 100 is preferably greater than about 50, more preferably greater than 75 µm. Also, it should be understood that the low index ring 106 is the outermost glass layer of the optical fiber 100. Further, the low index ring 106 is spaced apart from the core 102 by inner cladding 104 and the low index ring 106 is positioned in direct contact with the inner cladding 104.

The core 102 may have an index of refraction $n_1$ and a corresponding relative refractive index percent $\Delta_1\%$ relative to pure silica glass, the inner cladding 104 may have an index of refraction $n_2$ and a corresponding relative refractive index percent $\Delta_2\%$ relative to pure silica glass and the low index ring 106 may have an index of refraction $n_3$ and a corresponding relative refractive index percent $\Delta_3\%$ relative to pure silica glass such that $n_1>n_2>n_3$ and $\Delta_1\%>\Delta_2\%/>\Delta_3\%$ which corresponds to the step refractive index profile shown in FIG. 2. However, it should be understood that the core refractive index profile may also comprise a gradient refractive index profile, a rounded step refractive index profile, or another shape.

As noted herein, the core 102 of the optical fiber 100 has a radius $r_1$. In the embodiments described herein, the radius $r_1$ may be from about 2 µm to about 32.5 µm, more preferably from about 3 µm to about 15 µm, most preferably from about 3 µm to about 6 µm. Accordingly, the optical fiber 100 may be either a single mode optical fiber or a multi-mode optical fiber. For example, in one embodiment, the core 102 of the optical fiber 100 has a radius of less than about 10 µm, more preferably less than about 6 µm, such that the optical fiber is single moded at a wavelength of 1300 nm. However, it will be understood that the core 102 may have different dimensions to facilitate various other single mode and multi-mode embodiments.

The core 102 may comprise pure silica glass ($SiO_2$) or, alternatively, the core 102 may comprise one or more index of refraction raising dopants such as, for example, $GeO_2$, $Al_2O_3$, $P_2O_5$, $TiO_2$, $ZrO_2$, $Nb_2O_5$ and/or $Ta_2O_5$, such as when the core 102 is "up-doped." For example, when the core is up-doped, the core 102 may contain from about 4.0 wt. % to about 20 wt. % $GeO_2$. Accordingly, in one embodiment, the core 102 may comprise from about 4.0 wt. % to about 6.5 wt. % $GeO_2$, more preferably from about 5.0 wt. % to about 6.0 wt. % $GeO_2$, and, most preferably, from about 5.2 wt. % to about 5.5 wt. % $GeO_2$, which increases the index of refraction $n_1$ of the core 102. Accordingly, when the core 102 is up-doped with $GeO_2$ as described herein, $\Delta_1\%$ of the core 102 may be from about 0.2% to about 2%. In the exemplary refractive index profile of the optical fiber 100 shown in FIG. 2, the core 102 is up-doped such that the refractive index of the core is greater than the refractive index of pure silica glass ($n_{Si}$).

It should be understood that the phrase "pure silica glass," as used herein, means that the core 102 of the optical fiber does not contain material, such as dopants and/or other trace materials, in an amount which would significantly alter the refractive index of the silica glass in the core. However, small amounts of dopants (e.g., chlorine and/or fluorine in an amount less than 1500 ppm of each) may be present in the core which is otherwise pure silica. Preferably, embodiments which employ a "pure silica" core are free from germania.

As described herein, the inner cladding 104 has a radial thickness $T_2=r_2-r_1$. The radial thickness $T_2$ of the inner cladding 104 may depend on the desired dimensions of the core 102 and the desired dimensions and bend properties of the glass portion of the optical fiber 100 (discussed further herein). The inner cladding 104 may generally have a radial thickness of less than about 40 µm, preferably less than about 35.5 µm.

The inner cladding 104 may comprise pure silica ($SiO_2$) glass, silica glass with one or more dopants which increase the index of refraction (e.g., $GeO_2$, $Al_2O_3$, $P_2O_5$, $TiO_2$, $ZrO_2$, $Nb_2O_5$ and/or $Ta_2O_5$), such as when the inner cladding 104 is "up-doped," or silica glass with a dopant which decreases the index of refraction, such as fluorine, as when the inner cladding is "down-doped." For example, in one embodiment, the inner cladding is pure silica glass as shown in the exemplary refractive index profile depicted in FIG. 2, and preferably comprises a $\Delta_2\%$ from about −0.5 to about 0.5, more preferably from about −0.5 to about 0. In another embodiment (not shown) the inner cladding may comprise silica glass down-doped with fluorine from about 0.5 wt. % to about 3 wt. %, more preferably from about 1.5 wt % to about 3 wt. % fluorine and most preferably, from about 1.8 wt. % to about 2.5 wt. % fluorine. In general, the composition of the inner cladding 104 and the composition of the core 102 may be such that the difference between $\Delta_1\%$ and $\Delta_2\%$ (e.g., $\Delta_1\%-\Delta_2\%$) may be greater than about 0.1%, more preferably greater than about 0.2% and, most preferably, from about 0.25% to about 1%.

Referring to FIG. 1, the low index ring 106 has a radial thickness $T_3=r_3-r_2$. The radial thickness $T_3$ of the low index ring 106 may generally be from about 5 µm to about 20 µm. In some embodiments (described hither herein), the low index ring may be less than about 10 µm and, more preferably, less than about 7.5 µm.

The low index ring 106 may comprise silica glass down-doped with fluorine and boron. For example, the low index ring 106 may comprise from about 0.5 wt. % to about 5 wt. % F and from about 0.5 wt. % to about 20 wt. % B in the form of $B_2O_3$. In one embodiment, the low index ring 106 may comprise from about 3 wt. % to about 10 wt. % B and from about 0.5 wt. % to about 3 wt. % F, and, most preferably, from about 4 wt. % to about 6 wt. % B and from about 2 wt. % to about 3 wt. % F such that the relative refractive index percent ($\Delta_3\%$) of the low index ring 106 relative to pure silica glass is less than about −0.5%, more preferably less than about −1.0%, even more preferably less than about −1.5% and, most preferably, about −2.0%.

In one embodiment, the core 102, inner cladding 104 and low index ring 106 of the optical fiber 100 may be formed by an outside-vapor-deposition (OVD) process. The OVD process is a way of making optical fiber through reactions from the desired vapor ingredients (including silica and the other desired dopant precursors) via a hydrolysis process in a $CH_4$+$O_2$ flame to form soot-particles, which are then collected by thermopheretic means onto either a bait rod (for making a core soot-preform) or a glass core cane or rod (for making overelad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. For example, the core/cladding preform may be generated first, then consolidated, and the final (consolidated) preform drawn into the optical fiber 100 by known fiber-drawing methods.

More specifically, vapor-precursor-materials that may be used to make the portion of the soot preform associated with the fiber core are, for example, $SiCl_4$, $GeCl_4$, $AlCl_3$, $TiCl_4$, or $POCl_3$. As described herein, the core may comprise $GeO_2$ doped silica glass. After the up-doped $SiO_2$ soot is consolidated into the core preform, soot of pure $SiO_2$ may be deposited on the core preform to form a soot preform of the inner cladding portion of the optical fiber and which is thereafter consolidated. The soot preform of the inner cladding portion may be consolidated to form a silica inner cladding layer having a $\Delta_2\%$ from about −0.5 to about 0.5, or alternatively in the case of an optical fiber having a "pure" silica core, the inner cladding region may be consolidated in the presence of a gas containing F, such as $SiF_4$, such that, after consolidation, the inner cladding portion is down-doped with a desired amount of fluorine.

In one embodiment, after the core/cladding preform is formed, $SiO_2$ down doped with $B_2O_3$ is deposited on the consolidated core/cladding preform to form a soot preform of the low index ring portion. The deposited $SiO_2$ down doped with $B_2O_3$ is then consolidated in the presence of a gas containing a fluorine compound to introduce fluorine into the low index ring and thereby further lower the refractive index of the low index ring portion of the preform. The soot preform according to this embodiment may be consolidated in a furnace with a fluorine containing compound, for example with $SiF_4$, $CE_4$ or $BF_3$. Fluorine (F) sinter-doping into the boron-containing soot-preform, according to an embodiment of this invention, is a single-zone consolidation process. The entire consolidation process occurs in the lower temperature furnace's drying zone region, which is usually situated in the upper part of the standard consolidation furnace. Consolidation is done at relatively low temperatures due to the rather low glass-transition temperature ($T_g$) of the B/F co-doped silica (which is around 800° C. or lower). The exemplary silica soot preform (doped with B) may be first $Cl_2$-dried at around 850° C.-900° C. for 45-60 minutes. The dry-zone temperature is then ramped-up to 1100° C. for sinter/F doping for 90 to 150 minutes with $SiF_4$. During sintering and F doping, the boron composition in the consolidated glass drops significantly. For example, for about 10 wt % boron in the soot phase, about 4-8 wt % boron remains in the fully consolidated glass phase. Such a reduction is caused by etch out of boron in the presence of fluorine. As a result, the boron and fluorine concentration in glass may be in the range of 4-8 wt % and 1.5-2.5 wt %, respectively. After the consolidation process, the consolidated preform is cooled down and taken to fiber draw.

While specific reference is made herein to various embodiments for forming an optical fiber 100 having a boron and fluorine co-doped low index ring, it should be understood that other processing techniques may be utilized to form boron and fluorine co-doped low index ring.

Referring to the embodiment of the optical fiber 100 shown in cross section in FIG. 1 and the corresponding refractive index profile shown in FIG. 2, the core 102, inner cladding 104, and low index ring 106 comprise the glass portion of the optical fiber 100 and the low index ring 106 of silica-based glass is an outermost glass layer of the glass portion. The glass portion of the optical fiber may be surrounded by an optical coating layer 108 extending from $r_3$ to $r_c$. The optical coating layer has a radial thickness $T_c=r_c-r_3$. The optical coating layer 108 may have a relative refractive index percent ($\Delta_c\%$) relative to silica glass where $\Delta_c\%$ is greater than $\Delta_2\%$, more preferably greater than $\Delta_1\%$. The optical coating layer 108 generally comprises at least one organic coating layer which protects the glass portion of the optical fiber 100.

In one embodiment, as shown in FIG. 1, the optical coating layer 108 may comprise a primary coating layer 110 and a secondary coating layer 112. The primary coating layer 110 may be formed of relatively soft polymer materials while the secondary coating layer 112 may be formed of harder polymer materials. More specifically, the primary coating layer 110 preferably exhibits a Young's modulus less than 100 MPa, more preferably less than 50 MPa, and most preferably less than 10 MPa and the secondary coating layer 112 preferably exhibits a Young's modulus greater than 500 MPa, more preferably greater than 700 MPa, and most preferably greater than 900 MPa. The materials used in the primary and secondary coating layers are commercially available in the form of UV curable urethane acrylate coating materials. Alternatively, the primary and secondary coatings may comprise materials similar to those disclosed in U.S. Pat. Nos. 6,849,333 and 6,775,451.

The optical coating layer 108, in conjunction with the low index ring 106, may be used to attenuate cladding modes which leak out of the core 102 of the optical fiber 100. A cladding mode is a propagation mode that is confined to the cladding of an optical fiber by virtue of the fact that the cladding has a higher refractive index than the surrounding medium, which is either air or the primary polymer coating layer. A cladding mode may be created when the fiber is bent which, in turn, causes the mode(s) propagating in the core to leak into the cladding. These modes are generally not desired as they may leak back into the optical fiber and diminish the propagation efficiency of the mode beam within the core of the optical fiber. In order to facilitate attenuation of these modes, the low index ring 106 may be thin, preferably with a radial thickness $T_3$ of less than about 20 µm, so as to enable any modes which leak out of the inner cladding 104 to continue out of the optical fiber 100 and into the coating layers where such modes are attenuated. The refractive index of the optical coating layer 108 is preferably higher than that of the inner cladding 104 (e.g., $\Delta_c\%>\Delta_2\%$) and more preferably higher than that of the core 102 (e.g., $\Delta_c\%>\Delta_1\%$) so that no cladding mode can propagate through the coating over any meaningful distance. In particular, the primary coating layer 110 exhibits a relative refractive index percent $\Delta C_1\%$ greater than 1%, more preferably greater than 2%, and most preferably about 2.35% and the secondary coating layer 112 exhibits a relative refractive index percent $\Delta C_2\%$ of greater than 2%, more preferably greater than 4%, and most preferably about 5%.

Figure 3:
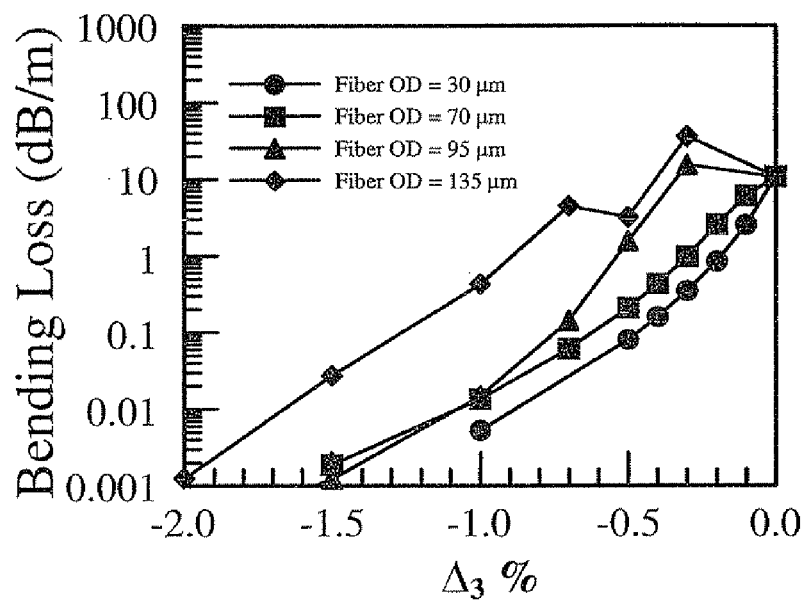
FIG. 3 illustrates the modeled bending loss in dB/m as a function of the relative refractive index percent ($\Delta_3\%$) of a low index ring in optical fibers having various inner cladding thicknesses and outer diameters.

FIG. 3 illustrates the modeled bending loss in dB/m versus the relative refractive index percent $\Delta_3\%$ for the low index ring 106 for optical fibers 100 with glass portions having various outer diameters (e.g., $2r_3$) and inner cladding 104 thicknesses (e.g., $T_2=r_2-r_1$). The models were based on a standard single mode glass optical fiber, such as SMF28® fiber manufactured by Corning, Inc., with a core 102 having a radius of about 4.2 µm and a relative refractive index percent $\Delta_1\%$ relative to pure silica glass of about 0.35%. The low index ring 106 had a radial thickness in each case of 5 µm. The radial thickness of the inner cladding 104 was varied such that the outer diameter of the glass portion (e.g., $2r_3$) of the fiber was 30, 70, 95 and 135 µm. Accordingly, by varying the thickness of the inner cladding 104, the distance of the low index ring 106 from the core 102 of the optical fiber 100 was also varied. Each model is based on bending the optical fiber 100 around a 20 mm diameter mandrel, and calculating the bending loss of the fiber as a function of the relative refractive index percent $\Delta_3\%$ of the low index ring 106 for various optical fiber outer diameters (e.g., positions of the low index ring 106 relative to the core 102). As illustrated in the modeled data shown in FIG. 3, when the outer diameter of the optical fiber 100 was 30 µm, the ability of the low index ring to reduce bending loss increases as $\Delta_3\%$ of the low index ring 106 decreases. In particular, a low index ring 106 having a $\Delta_3\%$ of about −0.5% improves the bend performance of a fiber having a diameter of about 30 µm relative to a low index ring having a $\Delta_3\%$ of about 0%.

Further, as shown in the modeled data depicted in FIG. 3, by positioning the low index ring 106 further from the core 102 of the optical fiber 100 (e.g., as the radial thickness of the inner cladding 104 increases), the relative refractive index percent $\Delta_3\%$ of the low index ring 106 needed to achieve the same relative amount of bend performance improvement is decreased (e.g., a low index ring with a lower $\Delta_3\%$ is needed to obtain the same bending performance). For example, a 30 µm outer diameter glass optical fiber with a low index ring having a $\Delta_3\%$ of −0.5 may have a modeled bending loss of about 0.1 dB/m. However, to achieve a modeled bending loss of about 0.1 dB/m with a 70 µm outer diameter glass optical fiber, a low index ring having a $\Delta_3\%$ of about −0.75 is required. Therefore, as the low index ring is positioned further from the core 102, $\Delta_3\%$ of the low index rings must be lower in order to achieve the same bending performance. In all cases, however (even for fibers with outer diameters of 95 µm and 135 µm) bending performance was significantly improved for low index rings 106 having a $\Delta_3\%$ less than about −0.5% and even more improved bend properties were achieved when $\Delta_3\%$ was less than about −1.0 and less than about −1.5 percent.

Accordingly, while the modeled data shown in FIG. 3 indicates that an improvement in the bending performance of an optical fiber may be achieved through the use of a low index ring in conjunction with optical fibers having various outer diameters, the benefit of using the low index ring to improve bend performance may be most applicable to smaller diameter optical fibers. Under these conditions (e.g., small outer diameter) the relative refractive index percent of the low index ring to achieve the desired bend performance benefit is readily realizable such as by co-doping the low index ring with boron and fluorine. As such, the glass portion of the optical fibers described herein may generally have an outer diameter of less than about 110 µm, more preferably less than about 90 µm, most preferably less than about 85 µm.

Figure 4:
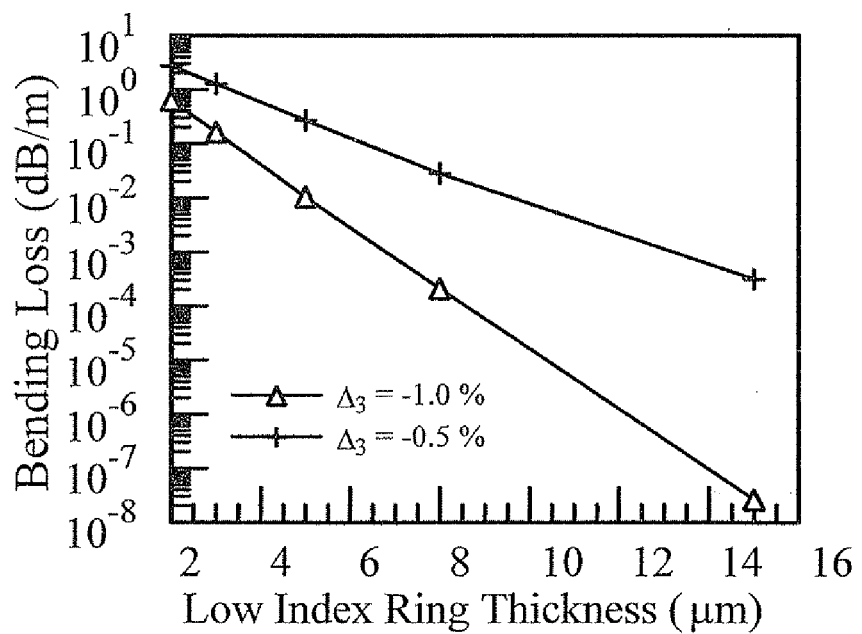
FIG. 4 illustrates the modeled bending loss in dB/m as a function of the radial thickness of the low index ring for two optical fibers having low index rings with different relative refractive indices.

FIG. 4 illustrates the modeled bending loss in dB/m (expressed on a log scale) as a function of the radial thickness of the low index ring 106 for two theoretical fibers having low index rings of different relative refractive indices. In both examples the optical fiber 100 was modeled as having an outer diameter of 80 µm, a core 102 with a relative refractive index percent $\Delta_1\%=0.35\%$ relative to pure silica glass and a radius $r_1$ of 4.2 µm (similar to standard single mode fibers). In both examples the low index ring 106 was modeled as being positioned directly against the inner cladding 104 of the optical fiber 100. Each model is based on bending the optical fiber 100 around a 20 mm diameter mandrel, and calculating the bending loss of the fiber as a function of the radial thickness of the low index ring.

As illustrated by the modeled data shown in FIG. 4, as the radial thickness of the low index ring 106 was increased, the calculated bending loss of the optical fiber decreases linearly. Accordingly, as the radial thickness of the low index ring 106 increases, the optical fiber 100 becomes more insensitive to bending. Further, when the refractive index of the low index ring 106 was lowered (e.g., when $\Delta_3\%$ was decreased), the bending insensitivity was further improved. Accordingly, the bending performance of the optical fiber is dependent on the radial thickness of the low index ring 106 as well as the relative refractive index percent of the low index ring 106.

While the bend performance of the optical fiber may improve with increasing radial thickness of the low index ring, increasing the radial thickness of the low index ring may cause more cladding modes to become trapped in the fiber which, as discussed above, may detract from fiber performance. Accordingly, in some embodiments, the low index ring may comprise a relative refractive index percent $\Delta_3\%$ of less than about −1.0% and a radial thickness of less than about 10 µm, preferably less than about 7 µm, in order to achieve the desired bend performance while preventing cladding modes from becoming trapped in the optical fiber. Alternatively, an optical fiber having a cutoff wavelength less than the operating wavelength (e.g. less than 1550, 1310, or 1060 nm) can be spliced to the launch or receiving end of the fiber to provide single mode transmission into the fiber, in which case these preferred restrictions on radial thickness of the low index ring could be relaxed. In this way, an apparatus may comprise a second fiber spliced which is spliced to one of the inventive fibers in the embodiments described above, wherein the second fiber is capable of transmitting single mode propogation at a wavelength less than 1650 nm.

Accordingly, to achieve improved bending performance, the low index ring may have a relative refractive index percent $\Delta_3\%$ of less than about −0.5%, preferably less than about −1.0%, more preferably less than about −1.5%, most preferably about −2.0%, and thin radial thickness, for example less than about 20 µm. In some embodiments, the radial thickness may be preferably less than 10 µm, even more preferably less than about 7 µm and most preferably from about 3 µm to about 5 µm. Further, the low index ring as described herein may be used in conjunction with a high index coating to strip unwanted cladding modes and improve the bend performance of the optical fiber 100.

It should now be understood that the optical fiber shown in FIG. 1 may comprise a low index ring 106 as the outermost glass layer of the glass portion of the optical fiber to remove unwanted cladding modes and improve the bending losses of the optical fiber by a factor of 10, 100 or even greater. For example, such fibers may have a 20 mm diameter macrobend induced loss of less than 0.5 dB/turn (9.25 dB/m), more preferably less than 0.1 dB/turn (1.85 dB/m), more preferably less than 0.06 dB/turn (0.93 dB/m), and most preferably less than about 0.03 dB/turn (0.47 dB/m) at 1550 nm.

The optical fiber 100 comprising a low index ring 106 disposed as the outermost glass portion or outer cladding of the optical fiber 100 may be applied to improve the bend performance of conventional fibers or enable new specialty fibers. For example, the improvement in the bending properties using the fiber structure and compositions disclosed herein may be particularly effective for fibers having smaller diameters, such as 80 µm diameter fibers (e.g., the outer diameter of the glass portion of the fiber is 80 µm in diameter) used for various applications including gyroscopes or erbium doped fibers for compact packaging because the bending performance of the optical fibers is pronounced when the low index ring 106 is positioned closer to the fiber core (e.g., the inner cladding 104 has a small radial thickness).

Using a low index ring 106 on a glass optical fiber having a glass portion with an outer diameter of less than about 110 µm surrounded by an optical coating layer such that the diameter of the glass portion and the coating portion (e.g., $2r_c$ in FIG. 1) is on the order of the outer diameter of a standard optical fiber, e.g. between about 120 and 130 microns, may enable the use of conventional fiber handling tools such as fiber holders, connectors, splicers and the like. For example, an optical coating of sufficient thickness may be applied to glass portion of an optical fiber having an outer diameter less than about 110 μm with a low index ring having a radial thickness of less than about 20 μm such that the coated optical fiber has approximately the same outer diameter as a conventional coated optical fiber (e.g., conventional fibers having outer diameters from about 240 μm to about 260 μm).

The bend insensitive fiber can also have a rare-earth doped core for to enable use as an amplifier fiber or a fiber laser for both telecom and non-telecom applications. In this case the rare-earth doped core may provide signal amplification when it is pumped with a pump light source. For example, an Er-doped core fiber can be used to construct an amplifier (EDFA) for amplifying signals over 1530~600 nm. The rare-earth dopants that can be used for signal amplification include but not limited to Nd, Yb, Er, Tm, and Ho. The core can be either single-moded or multi-moded. The single-moded core is mainly used for low power applications while the multi-moded core can mitigate unwanted nonlinear effects and thus is suited for high power applications.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising a silica-based glass portion having an outer diameter of less than about 120 μm, the glass portion comprising a core, an inner cladding, and a low index ring, wherein:
    the core comprises an index of refraction $n_1$, a relative refractive index $\Delta_1\%$ relative to the pure silica glass and a radius $r_1$;
    the inner cladding surrounds the core and extends from $r_1$ to $r_2$ such that the inner cladding has a radial thickness of $r_2 - r_1 < 40$ μm and the inner cladding comprises silica based glass, an index of refraction $n_2$, a relative refractive index percent $\Delta_2\%$ relative to pure silica glass, wherein $n_1 > n_2$ and the difference between $\Delta_1\%$ and $\Delta_2\%$ ($\Delta_1\% - \Delta_2\%$) is greater than about 0.1%; and
    the low index ring is an outer most glass portion of the optical fiber surrounding and directly contacting the inner cladding and extending from $r_2$ to a radius $r_3$ such that the low index ring has a radial thickness of $r_3 - r_2 \leq$ about 20 μm, wherein the low index ring comprises silica-based glass co-doped with boron and fluorine, a third index of refraction $n_3$ and a third relative refractive index percent $\Delta_3\%$ relative to pure silica glass, wherein $n_2 > n_3$, $\Delta_2\% > \Delta_3\%$ and $\Delta_3\%$ is less than about -0.5%; and
    a coating surrounding the low index ring, wherein the coating comprises a relative refractive index percent $\Delta_c\%$ relative to pure silica glass and $\Delta_c\% > \Delta_2\%$.

2. The optical fiber of claim 1 wherein the radius $r_1$ of the core is from about 2 μm to about 10 μm.

3. The optical fiber of claim 2 wherein the core is single moded.

4. The optical fiber of claim 2 wherein the core comprises a gradient index.

5. The optical fiber of claim 1 wherein the low index ring comprises from about 0.5 wt. % to about 3 wt. % fluorine and from about 3 wt. % to about 10 wt. % boron in the form of $B_2O_3$.

6. The optical fiber of claim 1, wherein the inner cladding comprises silica glass doped with fluorine and the core comprises pure silica glass.

7. The optical fiber of claim 6 wherein the amount of fluorine in the inner cladding is from about 0.5 wt. % to about 3.0 wt. %.

8. The optical fiber of claim 1, wherein the inner cladding comprises pure silica glass and the core comprises silica glass doped with $GeO_2$.

9. The optical fiber of claim 8, wherein the amount of $GeO_2$ in the core is from about 4.0 wt. % to about 20 wt. %.

10. The optical fiber of claim 1 wherein $\Delta_3\%$ is less than about -1.0% and the radial thickness of the low index ring is less than about 10 μm.

11. The optical fiber of claim 1, wherein the optical fiber has a macrobend induced loss of less than about 0.5 dB/turn for a bending diameter of 20 mm at a wavelength of 1550 nm.

12. The optical fiber of claim 1, wherein $\Delta_c\% > \Delta_1\%$.

13. The optical fiber of claim 1, wherein the optical coating extends from $r_3$ to a radius $r_c$, wherein $2r_c$ is between about 120 μm and 130 μm.

14. The optical fiber of claim 1, wherein:
    the coating comprises a primary coating layer and a secondary coating layer;
    the primary coating layer surrounds and directly contacts the low index ring and comprises a relative refractive index percent $\Delta_{c1}\%$ relative to pure silica glass and $\Delta_{c1}\%$ is greater than about 1%; and
    the secondary coating layer surrounds and directly contacts the primary coating layer and comprises a relative refractive index percent $\Delta_{c2}\%$ relative to pure silica glass and $\Delta_{c2}$ is greater than about 2%.

15. The optical fiber of claim 14 wherein $\Delta_{c1}\%$ is about 2.35% and $\Delta_{c2}\%$ is about 5%.

16. The optical fiber of claim 14 wherein the primary coating has a Young's modulus of less than about 100 MPa and the secondary coating has a Young's modulus of greater than about 500 MPa.

17. The optical fiber of claim 1 has a rare-earth doped core.

18. The optical fiber of claim 17 wherein the rare-earth doped core is single-moded.

19. An apparatus comprising a second fiber spliced which is spliced to a fiber in accordance with claim 1, wherein the second fiber is capable of transmitting single mode propagation at a wavelength less than 1650 nm.

* * * * *